United States Patent Office 3,390,162
Patented June 25, 1968

3,390,162
ORGANOSILICON COMPOUNDS AND METHOD OF MANUFACTURE
Abe Berger, Schenectady, N.Y., assignor to General Electric Company, a corporation of New York
No Drawing. Filed Nov. 13, 1964, Ser. No. 411,084
5 Claims. (Cl. 260—448)

ABSTRACT OF THE DISCLOSURE

Ketosilanes, such as ethoxydimethylsilylpropylmethyl ketone and dichloromethylsilylpropylmethyl ketone complexes of aluminum chloride, are prepared by reacting alkyl aluminum halides, such as methyl aluminum chloride, with corresponding silylpropionyl chlorides. The complexes are decomposed by reaction with water and the hydrolysis and condensation products of the silanes are useful in the formation of silicone fluids.

---

This invention relates to a novel process for forming organosilicon compounds, and to particular organosilanes and organopolysiloxanes produced thereby. More particularly, this invention is concerned with a process for forming ketosilanes and keto-substituted organopolysiloxanes and to particular novel products produced by the process.

The prior art has shown a number of processes for forming organosilicon compounds containing alkyl ketone substituents. Included among these processes are the reaction of silanes and siloxanes containing alkyl chains with unsaturated terminals with a compound containing an aldehyde group, as shown by Marsden in Patent 2,989,-559, and the two methods shown by Sommer in Patent 2,635,108. The Sommer methods include (a) the formation of ketone-substituted organosilicon compounds by the reaction of substituted acetoactic esters with iodosilanes, followed by hydrolysis and decarboxylation with hydrochloric acid or a dilute alkali-metal hydroxide solution, and (b) the formation of an acyl chloride chain on a silane followed by reaction of the acyl chloride with an organocadmium compound. Each of these methods is subject to severe limitations.

The aldehyde-olefin reaction for the formation of alkyl ketone-bearing organosilicon compounds is applicable only to organopolysiloxanes. In addition, the yields are extremely low, the Marsden patent reporting yields varying from 8% to only 31%. Still further, the presence of reactive functional groups other than the ketone is excluded.

The first method disclosed by Sommer, the reaction of acetoacetic esters with iodosilanes, is subject to two severe limitations. The first is that the iodosilane raw material is extremely difficult to produce, unstable, and extremely expensive. Thus, the utility of the acetoacetic ester-iodosilane process is correspondingly reduced. Second, the only alkyl ketone which can be produced by that process, is the 4-silyl-2-one compound. The acyl chloride-organocadmium process for producing alkyl ketone substituents on organosilicon compounds is more versatile. However, notwithstanding the versatility, the process is subject to limitations inherent in the use of organocadmium compounds. One of the major methods disclosed for forming organocadmium compounds involves a Grignard reaction in an ether solution. Additionally, the reaction of the dialkylcadmium with the acyl chloride-substituted silane is also carried out in ether solution. Such ether solutions, obviously, present an inherent problem in handling. Further, Sommer shows yields of only 53% and 59% utilizing the acetoacetic ester cleavage process and yields of only 29% and 45% based on the more versatile diorganocadmium reaction with the acyl chloride-substituted silane.

Alkylaluminum chlorides, which are available commercially, have a much greater solubility in organic materials than the organocadmium compounds, and may thus be used with any standard solvent. Further, while dialkyl cadmium compounds are extremely toxic, the alkylaluminum compounds are essentially non-toxic. In accordance with the present invention, it has unexpectedly been found that ketosilanes and keto-substituted organopolysiloxanes may be formed from the less expensive, less dangerous alkyl-aluminum compounds. Not only is the formation of the organosilicon compounds possible, but the process is even more versatile and provides higher yields than any of the previously disclosed processes.

Briefly, the process of the present invention involves contacting a silyl acyl chloride having the formula, (1) 

and an alkyl aluminum halide having the formula:

(2) $\qquad$ R'AlY$_2$ to produce a ketosilane having the formula:

(3) 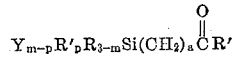

where Y is a halide substituent; R is selected from the class consisting of monovalent hydrocarbon radicals, halogen-substituted monovalent hydrocarbon radicals, and alkyl radicals substituted with OR'' groups, where R'' is a member selected from the class consisting of monovalent hydrocarbons free of aliphatic unsaturation, and monovalent radicals free of aliphatic unsaturation and consisting of carbon, hydrogen, and oxygen atoms, with each oxygen atom being attached to two carbon atoms; R' is any alkyl radical; $m$ is an integral number of from 0 to 3, inclusive; $a$ is an integral number of from 2 to 10, inclusive; and $p$ is an integral number of from 0 to 3, inclusive, and is no larger than $m$. Further when $m-p$ is from 1 to 3, inclusive, the compound can be subjected to further reaction to form other hydrolyzable groups on the ketosilane, or the ketosilane can be subjected to hydrolysis to produce keto-substituted organopolysiloxanes.

The novel organosilanes of the present invention are those having silicon-bonded hydrolyzable groups and having the formula:

(4) 

where R and R' are as previously defined; X is a group selected from the class consisting of halides, alkoxy radicals, aryloxy radicals, acyloxy radicals, and substituted and unsubstituted amine radicals; $a$ is as previously defined and $n$ is an integral number of from 1 to 3, inclusive. Thus, the novel organosilanes of the present invention are those which carry not only a reactive keto-substituent, but, additionally, have functional groups attached directly to the silicon atom and thus provide at least two reaction sites.

The novel organopolysiloxanes to which the present invention relates are the diorgano-substituted cyclopolysiloxanes where one of the organic substituents has a ketone group. These cyclopolysiloxanes are described by the formula:

(5) 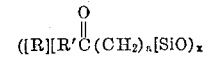

where R, R', and $a$ are as described above, and $x$ is an integral number of from 4 to 16. These cyclosiloxanes are particularly valuable in the formation of longer chain organopolysiloxanes, such as in the formation of organopolysiloxane elastomers.

The process of the present invention is, therefore, broadly one for producing organosilicon compounds having alkyl ketone substituents. The process, as noted, is adaptable not only to the particular novel organosilanes and organopolysiloxanes described above, but is useful in producing a broader range of alkyl ketone-substituted organosilicon compounds, including those described by Formula 3. Thus, the process allows the production of organosilanes having a wide variety of alkyl ketone substituents, the remaining valences of the silicon atom being satisfied either by hydrolyzable groups, or by hydrocarbon and oxygenated hydrocarbon groups, such as those set forth in the definitions of X and R. Further, when the ketosilane of Formula 3 where $m-p$ is 1, is subjected to hydrolysis, alkyl ketone-containing organodisiloxanes having the formula:

(6) 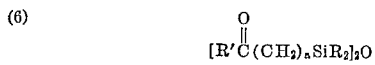

where R, R', and $a$ are as defined above, can be produced. These disiloxane materials are particularly useful as chain-stoppers for organosiloxane polymers.

The keto-silanes having hydrolyzable groups which can be produced by the process of the present invention are particularly useful in the production of other ketosilanes, alkyl ketone-substituted organopolysiloxanes, and especially in the production of copolymers having from 0.1 to 99.9 mole percent of units having the formula:

(7) 

and from 99.9 to 0.1 mole percent of units having the formula:

(8) 

where R, R' and $a$ are as previously defined, and $q$ is from 1 to 3, inclusive.

As has been described previously, the prior art has shown a number of processes for producing organosilicon compounds having ketone substituents. However, these ketone-substituted organosilicon compounds have been devoid of other functional groups. Thus, none of the prior art ketone-containing organosilicon compounds have been useful in the further syntheses of organopolysiloxanes containing ketone-substituted silicon atoms in a particular configuration or in a particular amount mixed with other types of substituted siloxane units. The present process is thus particularly valuable in that it allows the production of an organosilicon compound containing not only an alkyl ketone substituent, but additionally functional groups on the silicon atoms susceptible to hydrolysis and other forms of reaction. Such a material is useful as an intermediate for the preparation of organopolysiloxanes formed either wholly from the ketone-substituted organosilane or, by hydrolysis with other organosilanes, organosiloxane copolymers. Such organopolysiloxanes are useful as cosmetic base fluids. Further, the prior art has not shown the cyclic organopolysiloxane containing an alkyl ketone group. This type of compound has been found particularly valuable in the formation of organopolysiloxane elastomers. Exemplary of these elastomer raw materials which have proven invaluable are octamethylcyclotetrasiloxane and hexaphenylcyclotrisiloxane. Thus, the preparation of the cyclosiloxane provides an extremely valuable raw material for forming organopolysiloxane elastomers containing a desired percentage of silicon atoms substituted with an alkyl ketone group. These elastomers are particularly valuable as oil-resistant polymers.

The process of the present invention and the products produced will now be described in greater detail. The silyl acyl chloride reactants represented by Formula 1 can be, for example, gamma-trimethylsilylbutyryl chloride, beta-chlorodiphenylsilylpropionyl chloride, gamma-trichlorosilylbutyryl chloride, gamma-chlorodimethylsilylbutyryl chloride, gamma-chloromethylphenylsilylbutyryl chloride, beta-dichloromethylsilylpropionyl chloride, omega-chlorodimethylsilylvaleryl chloride, omega-dichloroethylsilyl-n-caproyl chloride, and omega-chlorobenzylpropylsilylcapryl chloride. This list should, of course, be taken as illustrative only of the compounds which can be described by Formula 1, and not as limiting in any way the full scope of the compounds.

The alkylaluminum halides described by Formula 2 are preferably chlorides, for example, methylaluminum chloride, ethylaluminum chloride, n-butylaluminum chloride, n-heptylaluminum chloride, n-nonylaluminum chloride, n-decylaluminum chloride, and even longer chain compounds, such as n-nonadecylaluminum chloride, n-eicosylaluminum chloride, n-tetracontylaluminum chloride, and others. These represent the preferred alkylaluminum halide reactants but, as described in Formula 2, the alkylaluminum compound can be any alkylaluminum halide and thus the bromides, chlorides, and iodides of alkylaluminum are also within the scope of this invention. The constituency of R' as shown in Formulas 2, 3, 4, 5, 6, and 7 is thus determined by the particular alkylaluminum halide which is utilized in the process. The group defined as R in Formulas 1, 3, 4, 5, 6, 7, and 8 represents essentially any hydrocarbon substituent which does not contain a reactive group. Within its scope are alkyl radicals such as methyl, ethyl, propyl, isopropyl, butyl, isobutyl, etc.; halogen-substituted alkyl radicals such as chloromethyl, chloroethyl, dichloropropyl, etc.; aryl radicals such as benzyl, tolyl, xylyl, phenethyl, etc.; halogen-substituted aryl radicals such as chlorophenyl, bromotolyl, etc.; and oxyhydrocarbon radicals such as paraphenoxyphenyl, butoxybutyl, t-butoxy-t-butyl, amyloxyamyl, and octyloxyoctyl.

Within the scope of X in Formula 4 are included specific groups such as chloride, bromide, methoxy, ethoxy, propoxy, isopropoxy, butoxy, phenoxy, toloxy, acetoxy, propionoxy, benzoyloxy, amine, dimethylamine, diethylamine, etc.

The reaction between the silyl acyl chloride of Formula 1 and the alkylaluminum halide of Formula 2 can be conducted in the absence of a solvent. However, due to the exothermic nature of the process, the reaction is preferably conducted in the presence of a solvent. When the silyl acyl chloride of Formula 1 contains halide substituents, that is, where $m$ is between 1 and 3, and it is desired to retain these substituents, the reaction must be run in the presence of a solvent. Any hydrocarbon solvent can be used, such as, for example, pentane, hexane, heptane, benzene, toluene, xylene, etc. Although aluminum chloride is generated in the reaction because of the exchange of the chloride atom on the acyl chloride and the R' group of the alkylaluminum halide, there is no problem of a competing Friedel-Crafts reaction. The reaction of benzene with the acyl chloride group is much slower than the reaction of the alkyl radical of the alkylaluminum halide with the acyl chloride group so that benzene can safely be utilized as a solvent. In fact, the aromatic hydrocarbon solvents are to be preferred to the aliphatic hydrocarbon solvents mentioned, as both the silyl acyl chloride and the alkylaluminum halide are completely soluble in aromatic solvents, thus giving a homogeneous reaction mixture. On the other hand, when paraffinic hydrocarbon solvents are utilized, a two-phase reaction system results due to the insolubility of an aluminum chloride complex of the ketosilane, formed in the reaction, in the paraffinic solvent, making recovery more difficult. Chlorinated aliphatic hydrocarbon solvents are not usable in the present process as they react with alkylaluminum halide compounds and thus severely limit the yield of the ketosilane.

The purpose of the solvent, as previously discussed, is for moderation of the reaction temperature and further to provide sufficient dilution of the silyl acyl chloride so that the acyl chloride group is preferentially reacted when it is desired to retain halide substituents on the silicon atom. Therefore, the amount of solvent which can be used is subject to wide variations. An excess of solvent will not interfere with the reaction and is less desirable only because of the problems in removing the excess. The silyl acyl chloride should be present in a concentration of from 25% to 70% in the solvent for proper dilution and heat absorption. The alkylaluminum halide can be used in any amount from a 20% concentration in the solvent to the pure compound. However, above a solution concentration of about 30%, the alkylaluminum compound may be spontaneously flammable. Therefore, for safety considerations, the preferred alkylaluminum halide solution contains from 20 to 30% of the compound. As previously mentioned, when the silyl acyl chloride of Formula 1 contains no halide substituents, that is, when $m$ is 0, or when the desired product is one of Formula 3 where $m-p$ is 0, the reaction can be run in the absence of a solvent.

When a chlorosilyl acyl chloride is to be reacted, and it is desired to retain the chloride substituent, the silyl acyl chloride should be dissolved in the solvent prior to the addition of the alkylaluminum halide. The alkylaluminum halide must then be added slowly to the silyl acyl chloride-containing solution. Full advantage is then taken of the dilution effect of the solvent to provide preferential reaction of the acyl chloride group and the problem of the presence of an excess of the alkylaluminum halide is not encountered. The addition time should be at least 90 minutes and can be up to about 6 hours. The preferred addition time is from 90 to two hours. Under these conditions, the alkylaluminum halide will preferentially react with the more reactive acyl chloride group rather than the halide substituents on the silyl radical. Again, when the initial silyl acyl chloride contains no halide substituents or when it is desired to produce a ketosilane having three alkyl substituents, the order and time of addition are immaterial, since the preferential reaction is no longer important.

The reaction will proceed at any temperature from about 10° C. to 120° C. When no halide substituent is present on the silicon atom of the silyl acyl chloride, that is when $m$ in Formula 1 is 0, or when a halide substituent is present but it is not desired to retain it, the two components can be combined as quickly as the exothermic nature of the reaction and reflux temperature will allow. However, when it is desired to retain the halide substituent, a preferred addition temperature is between 20° C. and 50° C. This lower temperature, in conjunction with a slower rate of addition, aids in the selective reaction of the chloride atom of the acyl chloride as opposed to the halide substituent on the silicon atom. Following addition, in any case, the reaction mixture should be refluxed for a period of from about ½ hour to 8 or more hours to complete the reaction.

The ratio of the reactants is not critical and the reaction will proceed, in the absence of a catalyst, with a stoichiometric ratio of 1:1. To make maximum utilization of the raw materials, however, the ratio of alkylaluminum halide to silyl acyl chloride should be within 5% of this stoichiometric ratio. When it is desired to retain halide substituents on the silicon atom, the reaction mixture should contain from a stoichiometric amount of the silyl acyl chloride to a 5% excess. While a certain percentage of halide substituents are retained, irrespective of the addition order, a greater percentage remain when the silyl acyl chloride is dissolved in the solvent and the alkylaluminum halide added to it.

Though the reaction has been described as one between a silyl acyl chloride and an alkyl aluminum halide, and descriptions of the process have been of the addition of an alkylaluminum halide, it should be understood that the alkylaluminum halide may be formed in situ. Thus, the silyl acyl chloride may be dissolved in the solvent, aluminum chloride added to it, and a trialkylaluminum compound added dropwise to the mixture to form alkylaluminum halides which then react with the silyl acyl chloride in the solvent solution. Due to the problem of a competing Friedel-Crafts reaction, when the alkylaluminum halide is formed in this way, the solvent system is limited to the paraffins and benzene, preferably the paraffins. When benzene is used, the reaction must be conducted at from about 20° to 50° C. to further minimize the problem of the competing Friedel-Crafts reaction. Further, the lower alkylaluminum compounds are pyrophoric and therefore must be contained in a solvent solution at a concentration no greater than 20–30%. However, alkylaluminums of $C_5$ and above are not pyrophoric and the same precautions need not be taken. While the reaction will proceed with only the trialkyl aluminum compound, in the absence of added aluminum halides, significantly lower yields are the result.

Regardless of whether the alkylaluminum halide is added as a formed compound or is formed in situ, the product resulting from the reaction is an aluminum chloride complex of the ketosilane. Several methods are available for breaking the complex and recovering the desired organosilicon material. The simplest method, when no halide substituents are present on the silicon atom of the ketosilane or when it is desired to form an organosiloxane compound, is to pour the solvent solution of the ketosilane-aluminum chloride complex over ice water. The water will both destroy the complex and act to hydrolyze any halide substituents on the silicon atom. Since the reaction is exothermic, ice is necessary to control the rate and temperature of reaction. The concentration of silane in water is immaterial, so long as enough water is present, stoichiometrically, to break the complex and hydrolyze the silane. Following hydrolysis, two layers are present: a solvent layer containing the ketone-substituted organosilicon compounds and an aqueous layer. The aqueous layer is separated, washed with an organic solvent to recover any organosilicon compound remaining in it, the aqueous layer discarded and the wash added to the solvent solution containing the organosilicon material. The extraction of the organosilicon material from the ice water is accomplished with a solvent selected from the class consisting of ethers, alkanes, aromatic compounds, and halogen-substituted hydrocarbons. Examples of these materials are diethyl ether, heptane, hexane, benzene, toluene, chlorobenzene, carbon tetrachloride, etc.

The combined solution of organosilicon material can be dried with any well-known drying agent as, for example, calcium sulfate, calcium chloride, or magnesium sulfate. The solvent solution containing the added drying agent is filtered to remove both the drying agent and the other filterable impurities, including reaction products of the formerly complexed aluminum chloride. The dried solution is then distilled to remove the solvent, leaving behind the ketone-substituted organosilicon materials. If both triorgano-substituted ketosilanes and ketone-substituted organopolysiloxanes are present, a fractionation is run, the first material to be distilled over being the ketosilane. Another method which can be used to break the aluminum chloride complex is particularly valuable when it is desired to retain a halide substituent on the silicon atom of the ketosilane. In this case, following reaction, a tertiary amine, sodium or potassium chloride, can be added to the solution to complex the aluminum chloride. Among the tertiary amines which can be used are pyridine, picoline, triethylamine, quinoline, or dialkyl anilines. After these complexing materials have been allowed to react, the mixture can be either distilled to remove the solvent and ketosilane product from the complexed aluminum salt or the mixture can be filtered to remove the complex. Non-halide-substituted organosilicon compounds can then be recovered by distillation to remove the solvent; halide-substituted ketosilanes are left in the solvent solution for further reaction, as desired.

Not only is the process of the present invention more versatile than those of the prior art, but additionally the product yield is significantly higher. For example, a combined yield of non-functional ketosilanes and ketone-substituted disiloxanes of 50% to 60% may be achieved. A yield of 67.5% of only the non-functional ketosilane can be formed and a homopolymeric siloxane of ketone-substituted material can be produced in a yield of 74% and more. The yield of chlorosilane bearing ketone substituents contained in a solvent solution is greater than 74%. A copolymer containing members of both Formulas 7 and 8 may be formed to yield more than 85% of the theoretical amount. Thus, the process which involves the reaction of a silyl acyl chloride with an alkylaluminum halide allows the formation of a much wider variety of ketone-substituted organosilicon compounds in significantly higher yields and with much greater safety than any of the processes described in the prior art.

The following examples will more clearly illustrate the process of the present invention and the method of forming the products of the present invention. These examples should not be considered as limiting in any way the full scope of the invention as covered by the appended claims.

Example 1

This example illustrates the formation of the alkylaluminum halide. A 0.03 mole portion (4.9 g.) of anhydrous aluminum chloride was placed under a nitrogen atmosphere. Using a hypodermic syringe, from 6–7 ml. (about 0.03 mole) of methyl aluminum sesquichloride were added to the aluminum chloride, and the resulting mixture heated to 100° C. until it became homogeneous. This resulted in the formation of methyl aluminum dichloride.

Example 2

In this example, the formation of both a triorgano-substituted ketosilane and a ketone-substituted disiloxane are shown. Additionally, this example illustrates the preferential formation of the triorganosilyl compound when the silyl acyl chloride is added to the alkylaluminum halide. A solution was prepared containing 0.09 mole (17.9 g.) of gamma-chlorodimethylsilylbutyryl chloride in benzene, in equal volumes. The silyl acyl chloride was added, dropwise, over a period of about two hours to the previously formed methyl aluminum chloride. On completion of the addition, the reaction mixture was refluxed for 1½ hours and then poured into a bath of ice water for hydrolysis. A VPC (vapor-phase chromotography) scan of the products in the organic solvent phase indicated the presence of: (1) 5-trimethylsilyl-2-pentanone and (2) a disiloxane having the formula $$[CH_3\overset{O}{\overset{\|}{C}}(CH_2)_3Si(CH_3)_2-O-(CH_3)_2Si(CH_2)_3\overset{O}{\overset{\|}{C}}CH_3]$$

This reaction mixture was distilled, yielding, as a first product after removal of the solvent, 5-trimethylsilyl-2-pentanone, which was found to have a boiling point at 40 mm. of 91°–94° C. An infrared analysist of this product confirmed its structure. The weight of the 5-trimethylsilyl-2-pentanone was 5 g. or a yield of 35% based on the theoretical. The second product resulting from the distillation was the aforementioned disiloxane which had a boiling point at 1.0 mm. of 136°–140° C. An infrared analysis of this product showed, in addition to the disiloxane peak at 9.5–9.7 microns, a structure comparable to that of the 5-trimethylsilyl-2-pentanone. The yield of disiloxane was 2 g. or 15% based on the theoretical. Thus, the total yield of ketone-substituted organosilicon compounds was 50%.

Example 3

This example demonstrates the usefulness of the process of the present invention with non-halide-substituted silicon atoms. Under a nitrogen atmosphere, 22.8 parts of triethyl aluminum were added to 300 parts of hexane in a flask. The hexane solution was stirred and 53.4 parts of anhydrous aluminum chloride were slowly introduced into the flask. The contents were heated at reflux until the aluminum chloride dissolved, which produced 76.2 parts of ethyl aluminum dichloride. The reaction mixture was kept at reflux (60°–70° C.) and 98.2 parts of trimethylsilylbutyryl chloride were added dropwise over a period of about 45 minutes. As the reaction was exothermic, the heat source was removed and refluxing rate controlled by the rate of addition of the silyl acyl chloride. After the addition was complete, the contents of the flask were kept at reflux through the use of external heat for an additional 3 hours. When refluxing and stirring were stopped following the 3 hour period, two phases were found, the bottom phase representing the aluminum chloride complexed ketosilane. The reaction mixture was poured onto ice and again gave two phases, an organic phase and an aqueous phase. The organic phase was separated and 10 g. of magnesium sulfate added with stirring for purposes of drying. The mixture was filtered through filter paper to remove the hydrated magnesium sulfate. The filtrate was stripped to remove the solvent and the remaining material fractionated. A colorless liquid boiling at 115°–117° C. at 50 mm. was obtained in an amount of 63.6 parts, representing a yield of 67.5% based on theoretical. An infrared scan of this product showed an absorption band at 5.78 microns, characteristic of a carbonyl compound. The compound, which had a pleasant odor was determined to have the structure:

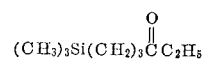

Example 4

This example corresponds to Example 2, with the exception that the alkylaluminum halide was added to the silyl acyl chloride to preferentially form the ketone-substituted disiloxane rather than the trialkylketosilane. Thus, the major portion of the silane product contained halide-substituted silicon atoms so that on hydrolysis the disiloxane was obtained in preference to the trialkylketosilane. A solution containing 23.8 parts of chlorodimethylsilylbutyryl chloride in 75 parts of anhydrous benzene was prepared in a flask. A nitrogen atmosphere was applied and the solution was heated to reflux. A second solution containing 13.5 parts of methyl aluminum dichloride in 50 parts benzene was added dropwise over a period of 1½ hours to the acyl chloride solution. The time of addition was prolonged because of the exothermic nature of the reaction, necessitating a longer addition time to control reflux and to preferentially react the acyl chloride. The reaction mixture was refluxed for ½ hour following the addition, after which the products were recovered in the same manner as described in Example 2. The yield of the disiloxane was 9 parts or 50%, while the yield of the trialkylketosilane was 2 parts, or approximately 11%, based on the theoretical. Thus, the total yield of ketone-substituted material was about 61%, as compared with the total yield of about 50% in Example 2. In addition, in this case over 80% of the yield was of the disiloxane material. The disiloxane had a boiling point of 107°–108° C. at 0.1 mm.

Example 5

This example demonstrates the preparation of a ketosilane having halide substituents on the silicon atom following formation of the ketone from the acyl chloride substituent. Hydrolysis of the halide-substituted ketosilane resulted in an organopolysiloxane having recurring units of formula $R'''_2SiO$, where $R'''$ is a monovalent organic radical. This is the unit characteristic of silicone fluids and elastomers. A flask was equipped with a condenser, addition funnel, stirrer, and thermometer. A solution containing 56.5 parts methyl aluminum dichloride in 150 parts of hexane was placed in the addition funnel. A solution containing 102.5 parts beta-dichloromethylsilylpropionyl chloride and 50 parts hexane was placed into the flask. An ice bath was placed around the flask to prevent overheating and, while maintaining an inert atmosphere in the flask, the alkyl-aluminum chloride solution was added in portions over a period of 2 hours. The temperature in the flask was maintained at 30°±10° C. by the slow rate of addition of the alkylaluminum halide in conjunction with the exothermic reaction and the ice bath. Near the end of the addition, the alkylaluminum compound was added more rapidly. Two phases formed as soon as the alkylaluminum halide addition was begun; a dark red lower phase consisting of the aluminum chloride complexed ketosilane and an upper phase containing the hexane and unreacted acyl chloride. When the addition was completed, the contents of the flask were brought to reflux temperature (70° C.) and maintained there for an additional 8 hours. This resulted in the preparation of an aluminum chloride complex of a ketosilane of the formula:

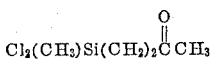

The contents of the flask were then carefully poured into ice water to break the aluminum chloride complex and hydrolyze the halide-substituted ketosilane resulting in a vigorous evolution of hydrogen chloride.

The aqueous layer resulting from the hydrolysis was separated and washed several times with ether. The ether extracts were separated from the aqueous phase and combined with the organic layer, which was then dried, filtered, and stripped to dryness as in Example 3. A mobile fluid remained in the flask. An infrared spectrum of this fluid showed a ketone band at 5.8 microns and a broad band at 9.2–9.7 microns which is characteristic of polysiloxane materials having the structure R'''$_2$SiO in recurring units. In particular, the portion of the band for 9.2–9.4 microns showed the presence of a significant amount of cyclosiloxanes of the formula (R'''$_2$SiO)$_x$, where $x$ is from 4 to 16. The yield of siloxane materials was 48 g., 74% based on the theoretical amount.

Example 6

In this example, the presence of chlorosilanes is again demonstrated by the ability to cohydrolyze the ketosilane with other diorganodichlorosilanes. An aluminum chloride complex of 4-dichloromethylsilyl-2-butanone was produced, as in Example 5, from 102.5 parts of dichloromethylsilylpropionyl chloride and 56.5 parts methyl aluminum dichloride. Dimethyldichlorosilane in an amount of 645 parts was immediately added to the halide-substituted ketosilane. The resulting solution was hydrolyzed and purified as described in Example 5. An infrared scan of the hydrolysis product, an oil, was superimposable on scans of dimethylpolysiloxane and but-3-one-yl methylpolysiloxane. The yield was 395 parts, a yield of 85.3% based on the theoretical.

Example 7

A solution containing 11.3 parts methyl aluminum dichloride and 35 parts benzene is added slowly, over a period of about 2 hours, to a solution of 20 parts of chlorodimethylsilylbutyryl chloride in 100 parts of benzene. During the addition the solution temperature is maintained at 30°–40° C. with external cooling. The mixture is refluxed for about 3 hours and results in a solution containing 31.3 parts of 4-chlorodimethylsilyl-2-butanone in 135 parts benzene, the ketosilane being complexed with aluminum chloride. To this reaction product is added a solution of 20.2 parts triethylamine in 50 parts benzene, while supplying external cooling. This solution is vigorously stirred and 23 parts of ethanol are added to it, in portions, over a period of about 1 hour. The mixture is thereafter refluxed for 2 hours and is then cooled and filtered. The filtered solution is vacuum stripped and the resulting oil extracted with several portions of hexane.

These hexane extracts are combined, dried, and filtered. The hexane phase is removed by distillation and leaves a product of the formula:

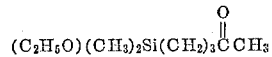

Another method for forming an alkoxy-substituted ketosilane, that is a ketosilane of Formula 4 where X is alkoxy, involves the reaction of a halide substituted ketosilane, such as that of Formula 3 where $m-p$ is from 1 to 3, inclusive, with an alcohol in the presence of excess pyridine. The aluminum chloride complex of the ketosilane of Formula 3 is reacted with an alcohol of formula ZOH, where Z is an alkyl radical, in the presence of excess pyridine to produce an alkoxy ketosilane of the formula:

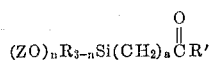

where Z, R, R', $n$, and $a$ are as previously defined; in addition to pyridine salts, a trialkoxy aluminum compound and excess solvent and pyridine. The solution is filtered to remove the pyridine salts and the trialkoxy aluminum and a distillation is then conducted to remove the excess pyridine and solvent leaving the alkoxy ketosilane just described.

Thus, a versatile process has been described for the production of ketosilanes and polysiloxane compounds having ketone substituents. In addition to the reactions which the compounds produced by the process of the present invention can undergo because of the silane or siloxane structure, these compounds can be subjected to reactions which are generally used with ketones. For example, they can be treated with reagents such as alkylmagnesium halides. When 5-trimethylsilyl-2-pentanone is treated with methyl magnesium bromide, in ether, a product results which, on hydrolysis, yields a tertiary alcohol having the formula, [(CH$_3$)$_3$Si(CH$_2$)$_3$C(CH$_3$)$_2$OH]. By treating this alcohol with concentrated hydrochloric acid at room temperature, the alcohol can be converted to a chloride having the formula

[(CH$_3$)$_3$Si(CH$_2$)$_3$C(CH$_3$)$_2$Cl]

Additionally, methyl ketones can undergo Claisen condensations or other base-type condensations with aldehydes and ketones to produce other novel intermediates. In addition to the versatility of the process, it is more easily manageable than prior art methods for forming ketone-substituted organosilicon compounds, for reasons of raw material toxicity, available solvents, and the fact that the reaction system is wholly liquid.

Further, the products of the present invention provide advantages not hitherto available in ketone-substituted organosilicon materials. The ketone-substituted silanes, where the silicon atom retains functional groups, such as halides and alkoxy radicals, provides for more facile modes of reaction along the lines presently used in organosilicon chemistry. The production of ketone-substituted cyclopolysiloxanes provides a compound for the formation of novel organopolysiloxane fluids and elastomers with a determinable percentage of ketone substituents.

While specific embodiments of the invention have been shown and described, the invention should not be considered as limited to the particular formulations used or structures shown. It is intended, therefore, by the appended claims, to cover all modifications within the spirit and scope of this invention.

What I claim as new and desire to secure by Letters Patent of the United States is:

1. A ketosilane having silicon-bonded hydrolyzable groups having the formula:

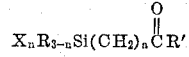

where X is alkoxy; R is selected from the group consisting of monovalent hydrocarbon radicals, halogen-substituted monovalent hydrocarbon radicals, and alkyl radicals substituted with an OR″ group, where R″ is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to two carbon atoms; R′ is an alkyl radical; $n$ is an integral number of from 1 to 3, inclusive; and $a$ is an integral number of from 2 to 10, inclusive.

2. An organosilane of claim 1, wherein X is an ethoxy radical.

3. An organosilane having the formula:

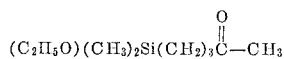

4. A process for forming an aluminum chloride complex of a ketosilane having the formula:

comprising contacting a silyl acyl chloride having the formula:

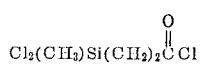

with an alkylaluminum halide having the formula:

$CH_3AlCl_2$ in the presence of a hydrocarbon solvent at a temperature of about 20 to 50° C.

5. A process for forming an aluminum chloride complex of a ketosilane having the formula:

comprising contacting a silylacyl chloride having the formula:

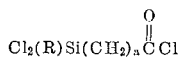

with an alkylaluminum halide having the formula:

in the presence of a hydrocarbon solvent at a temperature of about 20 to 50° C., where R is selected from the class consisting of monovalent hydrocarbon radicals, halogen-substituted monovalent hydrocarbon radicals, and alkyl radicals substituted with an OR″ group, where R″ is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to carbon atoms; R′ is an alkyl radical; and $a$ is an integral number from 2 to 10, inclusive.

References Cited

UNITED STATES PATENTS

| Re. 25,727 | 2/1965 | Haluska | 260—448.2 |
| 2,635,108 | 1/1951 | Sommer | 260—448.2 |
| 2,900,363 | 8/1959 | Bluestein | 260—448.2 |
| 2,945,874 | 7/1960 | Jenkner | 260—448.2 |
| 2,989,559 | 6/1961 | Marsden | 260—448.2 |

OTHER REFERENCES

Zeiss, "Organometallic Chemistry," Reinhold Pub. Corp., New York (1960), p. 241.

Fieser and Fieser, "Organic Chemistry," Reinhold Pub. Corp., New York (1956), p. 182.

TOBIAS E. LEVOW, *Primary Examiner.*

H. M. S. SNEED, *Assistant Examiner.*